United States Patent [19]

Poynton

[11] 4,395,384

[45] Jul. 26, 1983

[54] PROCESS FOR TREATING ZIRCON

[75] Inventor: Corbett J. Poynton, Perth, Australia

[73] Assignee: Allied Eneabba Limited, Perth, Australia

[21] Appl. No.: 365,884

[22] Filed: Apr. 6, 1982

Related U.S. Application Data

[63] Continuation of Ser. No. 142,369, Apr. 17, 1980, abandoned.

[51] Int. Cl.³ .................... C01G 25/02; C22B 34/14; C03C 23/00; C09C 1/28
[52] U.S. Cl. .......................................... 423/1; 423/80; 423/86; 106/299; 75/1 R; 134/2; 134/4; 209/212; 209/11; 209/127 R
[58] Field of Search ................ 423/80, 86, 326, 1; 106/299; 75/1 R; 134/2, 4, 25.1

[56] References Cited

U.S. PATENT DOCUMENTS

| 2,023,278 | 12/1935 | McGregor | 423/340 |
| 2,890,949 | 6/1959 | Blanton et al. | 423/71 |
| 3,166,430 | 1/1965 | Seabright | 106/299 |
| 3,656,938 | 4/1972 | Penzes | 75/2 |

FOREIGN PATENT DOCUMENTS 622448 6/1949 United Kingdom ................ 106/299

OTHER PUBLICATIONS

Beger, G. H. et al., "Caustic Treatment of Zircon Sand", U.S. Atomic Energy Commission, ISC-437, (Rev), 8-17-54.

Primary Examiner—Brian E. Hearn
Assistant Examiner—Chung K. Pak
Attorney, Agent, or Firm—Harness, Dickey & Pierce

[57] ABSTRACT

A process for the treating of zircon to remove a coating which contains iron from the surface of individual grains to make them move amenable to electrostatic and magnetic separation, wherein the method comprises coating the zircon grains with a strong basic reagent, calcining the coated grains and treating the calcined grains to remove the calcined impurities.

10 Claims, No Drawings

PROCESS FOR TREATING ZIRCON

This is a continuation, of application Ser. No. 142,369, filed Apr. 17, 1980, abandoned.

This invention relates to a process for treating zircon to remove a coating containing iron from the surface of the individual grains and also removing impurities existing as individual grains so as to make them more amenable to electrostatic and magnetic separation.

There are a number of know processes by which surface staining (mainly iron as $Fe_2O_3$) can be removed or substantially reduced either by 1. Attritioning—a process where particles in the form of a high density pulp are vigorously agitated by means of propellers or impellors resulting in grains scrubbing against one another and scraping the impurity from the grain surface.
2. Attritioning as described in 1 above with the addition of certain chemicals to aid the cleaning process.
3. Attritioning as described in 1 above in a weak acid solution.
4. Attritioning using a grinding medium such as finely ground quartz.
5. Chemical dissolution by means of acid treatment at elevated temperatures.

All of the above processes do improve the quality and colour of the zircon material. However, they are limited in their effect to reduce the iron coating below certain levels and have a limited effect on the reduction of impurities existing as discreet grains. For example, a standard grade zircon with an iron impurity level of 0.06 to 0.07% of iron measured as $Fe_2O_3$ when treated with concentrated hydrochloric acid or sulphuric acid for long periods either at ambient or elevated temperatures will reduce the iron level to a minimum of 0.035%.

It has now been found that by coating the grains with a strong basic reagent such as sodium hydroxide or sodium carbonate and calcining the coated grains the surface coating is rendered more amenable to subsequent treatment to produce a product having a reduced ferric oxide content and a whiter appearance.

Thus in one form the invention resides in a process for treating zircon which comprises coating the grains with a strong basic reagent, calcining the coated grains and treating the calcined grains to remove the calcined impurities.

The process was examined in the laboratory by batching small quantities of zircon sand (typically 100 grams) and using a muffle furnace to test the following parameters:

1. Reaction temperature
2. Retention time
3. Quantity of reagent material
4. Type of reagent Details of the findings on each parameter are given below:

TEMPERATURE

Sodium hydroxide melts at 318.4° C. and boils at 1390° C. and it is necessary that the operating calcining temperature exceed the melting point for the reaction to occur. Tests indicate that little reaction actually occurs until a temperature of 500° C. is exceeded. 600° C. is regarded as a practical minimum temperature for the production of a satisfactory product. Higher temperatures improved the overall quality and appearances of the product and tests were in fact conducted up to 1000° C. in increments of 100° C. For practical purposes there is a continuous improvement in the appearance of the product up to 800° C. with only a marginal increase after this temperature. 750° to 800° C. is the preferred operating range.

RETENTION TIME

Retention times from 10 to 120 minutes were tested. However, no apparent change occurs after 20 minutes at the maximum calcining temperature. It is assumed that a significant proportion of this time is involved in actual heating the grain up to a reaction temperature and that the actual reaction occurs in a relatively short time.

20 minutes was chosen as the preferred retention time for the process.

QUANTITY OF REAGENT MATERIAL

All the initial laboratory tests were conducted using sodium hydroxide. The quantities tested ranged from 1% to 10% sodium hydroxide by weight of zircon. It was apparent from these tests that the process is somewhat open ended in that the greater the quantity of reagent used the better the appearance and quality of the final product. However, 2 to 4% of sodium hydroxide by weight of zircon produced a satisfactory material.

VARIOUS REAGENTS

Although all the initial work was conducted using sodium hydroxide as the reagent, subsequent tests indicated that most alkali metal compounds produced similar results. Sodium hydroxide had the advantage of being easy to obtain and relatively cheap. Sodium carbonate was also used, but required higher temperatures as the melting point is significantly above that of sodium hydroxide. Other alkali compounds tested were sodium peroxide, sodium nitrate, sodium sulphate and sodium chloride. All of these indicated drawbacks, particularly the nitrate which decomposes to produce oxide of nitrogen fumes. The use of sodium hydroxide or sodium carbonate is a pollution free process with no fumes and with careful selection of materials, few corrosion problems.

A similar series of tests were performed using potassium salts including potassium hydroxide, potassium carbonate, potassium and nitrate.

The actual quantities of each of these reagents varied when compared to the sodium hydroxide quantity of 2 to 4% by weight due to the different molecular weights of each of the compounds.

EXAMPLE I

In the following specific example based upon the above described laboratory work a solution of 24% W/W sodium hydroxide was mixed with a dry zircon product so as to coat each grain with an average of 2.5 to 3% W/W (sodium hydroxide/zircon) of sodium hydroxide. The dry product had the following analysis:

CHEMICAL ANALYSIS $ZrO_2$ (including $HfO_2$)—66.0%
$Fe_2O_3$—0.07%
$TiO_2$—0.1%
$Al_2O_3$—<0.5%
$SiO_2$ (Total)—32.8%
Free Silica—0.1%
$P_2O_5$—0.07%

$Cr_2O_3$—<0.005%
$V_2O_5$—<0.001%
Sulphur—<0.02%

PHYSICAL CHARACTERISTICS

Specific Gravity—4.6
Bulk Density—2.8 Kg/liter
Hardness (MOHS)—7.5
Melting Point—2,200° C.

The zircon material before upgrading is a smooth glassy grain with high internal reflectants. The grains are rounded and sub-angular and appear to be clean except for occasional staining with ferric oxide ($Fe_2O_3$). The general overall colour is light brown with a purplish background.

The coated material was then to be fed into a rotary calciner and dried in the first third of the kiln so as to coat each grain with a dry crust of sodium hydroxide. This was then subsequently calcined in the calcining section of the kiln at a temperature of 750° to 800° C. for an average retention time of 20 minutes. The product was then washed by conventional attritioning and counter current decantation in four stages so as to minimize the quantity of washing water. The material was then dewatered, dried, stored and sold.

The washing circuit consisted of conventional equipment i.e. sumps, pumps, dewatering cone filters, hydrocyclones and attritioners.

The washing stage was not only important for reducing the iron level but also for the recovery of the unreacted sodium hydroxide to minimise reagent costs. The final quantities of water to be used and as a consequence the number of washing stages was determined by the amount of heat available in the calcined zircon material available to evaporate excess water and produce a 24% sodium hydroxide solution ready for reuse in the first part of the process.

The upgraded zircon product is white with the grain surface pitted and seems opaque rather than glassy and smooth. The actual surface appears mainly white and this is probably due to the altered reflective properties of the upgraded material. As well as the typical effect i.e. cosmetic, the grains are generally free from surface impurities mainly iron ($Fe_2O_3$) and generally very clean. Other impurities consting of discreet rutile and kyanite grains are also attacked and the surface characteristics altered so as to make them much more amenable to electrostatic and magnetic separation. As a result the final product is also low in $TiO_2$ (rutile) and kyanite levels. The analysis of the upgraded material was as follows:

CHEMICAL ANALYSIS $ZrO_2$ (Including $HfO_2$)—66.0%
$Fe_2O_3$—0.03%
$TiO_2$—<0.05%
$Al_2O_3$—<0.05%
$SiO_2$ (Total)—32.8%
Free Silica—<0.01%
$P_2O_5$—0.07%
$Cr_2O_3$—<0.005%
$V_2O_5$—<0.001%
Sulphur—<0.02%

PHYSICAL CHARACTERISTICS

Specific Gravity—4.6
Bulk Density—2.8 Kg/liter
Hardness (MOHS)—7.5
Melting Point—2,200° C.

Following the initial laboratory work it was decided to test the process using a rotary kiln simulator consisting of a sealed rotating pot inserted into a muffle furnace. It was then planned to conduct a pilot plant test using the variables established in this initial series of trials.

The rotary simulator confirmed the variables established during laboratory batch tests and as a result it was decided to run a pilot plant test at a calcining temperature of 800° C. using 2% sodium hydroxide for a retention fire of 20 minutes at the maximum calcining temperature. The rotary simulator tests also confirmed that approximately ½% of the original 2% of the sodium hydroxide was consumed during the reaction with the remaining 1½% available for recovery. Thus, at this stage, there appeared to be no changes in the process between the laboratory batch tests and the rotary simulator tests.

The pilot plant kiln was a refractory lined direct fired rotary kiln approximately 17 feet long and 14 inches internal diameter. Firing was directly into the shell without a combustion chamber using natural gas as a fuel. This first pilot plant test confirmed that an excellent product could be produced using the above parameters but also high lighted an alteration in the process chemistry.

As has been previously explained in the laboratory and rotary simulator tests the actual reaction takes place between the zircon grain surface and the melted sodium hydroxide. However, in the direct fired kiln the majority of sodium hydroxide is converted to sodium carbonate and the reaction takes place with the sodium carbonate (or the products of decomposition of sodium carbonate-sodium peroxide). Sodium hydroxide melts at 318° C. and the conversion to sodium carbonate by reaction with the carbon dioxide from the products of reaction of the heat source is probably completed before 500° C. The major result of this change is that there is no caustic soda to be recovered in the washing stage and therefore with the products of reaction containing the impurities were not readily removed by attritioning as was the case in the previous tests. They were, however, very easily removed using dilute acid 3-4% by weight of zircon and required no mechanical agitation or attritioning. Acid treatment with mechanical agitation and attritioning were both tested but indicated no improvement in the final product quality.

The products of reaction in the pilot plant test were similar to those formed during the laboratory tests but in this case were formed as a carbonate complex. Full details of the products of reaction are discussed below under the heading "Process Chemistry".

The main beneficial effect of the formation of the carbonate complex is that during acid treatment the effervescence caused by the liberation of carbon dioxide creates a violet agitation at the grain surface which helps promote the removal of impurities.

One problem highlighted by the pilot plant test was the formation of a ring of material at the end of the flame envelope. If allowed to proceed the build up would have resulted in the complete blockage of the kiln. Removal of the build up at regular intervals is necessary to prevent blockage of the kiln.

Material from this pilot plant test was treated with acid (both sulphuric and hydrochloric) in strengths ranging from 1-10% V/W of zircon using no attritioning, attritioning, washing and attritioning and acid treatment and acid attritioning. From these tests it was clearly evident that the acid treatment stage was purely a chemical reaction and required no agitation or attritioning. Further, the more acid used, the better the final product. However, 3% W/W of sulphuric produced a satisfactory product when 2% W/W of sodium hydroxide was used as the original calcining reagent.

A second pilot plant test was run in order to examine the temperature dependence of the material build up problem in the kiln. The viability of the process had already been established in the first test and this second run using 2% sodium hydroxide with a retention time of 20 minutes for calcining temperatures of 700°, 750° and 800° C. was to establish the lowest possible operating temperature. This test indicated that no build up problem occurs below 730° C. but the final product required additional acid treatment to produce a satisfactory product. Between 760° and 780° C. a satisfactory material can be produced with minimal build up problems but again required additional acid treatment and was certainly not of the same quality as the material produced in the first pilot plant test. When the temperature of the kiln was raised to 800°–820° C. the quality of the material improved but the build up problem again became significant.

PROCESS CHEMISTRY

In the original laboratory tests using a muffle furnace, the reaction was assumed to be between the sodium hydroxide and the grain surface. Several products of reaction are formed, typical of which are as follows:
1. $NaOH + ZrO_2SiO_2$
   $Na_2SiO_3$ Sodium Silicate
   $Na_2ZrO_3$ Sodium Zirconate
   $H_2O$ Water
2. $NaOH + ZrO_2SiO_2 + Fe_2O_3$
   Na Fe $SiO_3$ Sodium Ferro Silicate
   Na Fe $ZrO_2$ Sodium Ferro Zirconate
   $H_2O$ Water The sodium hydroxide not consumed in the reaction and the products of reaction remain on the surface of the grain and can be removed by attritioning and washing. The use of hot water in both stages increases the rate of removal and decreases the number of stages required.

Acid washing removes the products of reaction, but not really any more effectively or efficiently than the attritioning and washing. The washing tests indicated that more than half (½) of the sodium hydroxide remains unreacted and therefore available for recovery. The use of acid would not allow this advantage.

The chemistry in a direct fired calciner is different from that of the laboratory tests in that the carbon dioxide formed in the combustion of the heating fuel converts most of the sodium hydroxide to sodium carbonate at a temperature below 500° C. The reaction subsequently takes place between the sodium carbonate and the grain surface. Similar products of reaction are formed but appear to be more complex in that a carbonate radical is also present. It is also thought that the following typical products are formed:
1. $Na_2CO_3 + ZrO_2SiO_2$
   $Na_2SiO_2CO_3$ Sodium Silicate Carbonate Complex
   $Na_2ZrO_2CO_3$ Sodium Zirconate Carbonate Complex
   $H_2O$ Water
2. $Na_2CO_3 + ZrO_2SiO_2 + Fe_2O_3$
   $Na_2$ Fe $SiO_3CO_3$ Sodium Ferro Silicate Carbonate Complex
   $Na_2$ Fe $ZrO_3CO_3$ Sodium Ferro Zirconate Carbonate Complex
   $H_2O$ Water Any sodium hydroxide remaining at the calcining temperature is assumed to react in a manner similar to the laboratory test chemistry, without the formation of the carbonate complex.

The reaction is believed to occur with the carbonate rather than any product of decomposition because of the presence of the carbonate in the material out of the kiln. Sodium carbonate melts at 851° C. but decomposes at some temperature above the melting point before the boiling point is reached. If the carbonate did decompose to sodium peroxide it is thought that the products of reaction would be similar to those formed in the muffle furnace. However, change is very evident.

Acid treatment of the material prepared in the rotary furnace effervesces vigorously because of the following reaction:

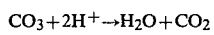
$$CO_3 + 2H^+ \rightarrow H_2O + CO_2$$

The standard milk of lime bubbling test has been performed to confirm that the gas evolved is actually carbon dioxide.

The acid treatment very easily removes the products of reaction from the grain surface and this is assumed to be aided by the formation of the carbon dioxide at the grain surface, i.e. the reaction is less controlled by diffusion of the acid to grain surface because of the vigorous local agitation caused by the release of the carbon dioxide.

No external agitation is necessary in order for the reaction to proceed to completion in a relatively short period.

Acid treatment and washing tests carried out include
1. Soaking in acid
2. Attritioning in acid
3. Washing with water followed by acid treatment
4. Attritioning water followed by acid treatment
5. Attritioning in water followed by attritioning in acid.

Although the carbonate products are clearly very soluble in acid, they are not so easily removed using only water. Tests performed include
1. Washing in water
2. Attritioning and washing in water
3. Soaking and washing in water.

The washed material is brown and is not white until leached with acid.

It was concluded that apart from the acid strength, the reaction was similar for all the above tests as it was purely a chemical reaction between the acid and the products of reaction on the grain surface. External mechanical agitation or prior washing do nothing to increase the reaction rate or the amount of acid required to produce a satisfactory product.

It should also be appreciated that the calcining process does not remove any impurities but simply converts them to a form in which they can be easily removed or separated. i.e. soluble in acid or water or more easily separated by standard electrostatic and magnetic processes.

I claim:
1. A process for the removal of surface impurities from zircon grains which comprises coating the zircon grains with a strong basic reagent, the coating being of an amount of 2 to 4% by weight of the zircon grains, calcining the coated grains at a temperature of at least 600° C. for a retention time of more than about 10 minutes and no more than about 20 minutes, and removing the calcinated surface impurities from the calcined grains.

2. A process as claimed in claim 1 wherein the basic reagent is sodium hydroxide or sodium carbonate.

3. A process as claimed in claim 2 wherein the amount of sodium hydroxide is between 2% and 4% by weight of zircon.

4. A process as claimed in claim 1, wherein the calcining is carried out at a temperature within the range 750° C. to 800° C.

5. A process as claimed in claim 1 wherein sodium hydroxide is used as the basic reagent and wherein the calcined material is washed with water by conventional attritioning.

6. A process as claimed in claim 5 wherein the washing water is heated to remove excess water and produce a solution of sodium hydroxide for re-use.

7. A process as claimed in claim 1 wherein sodium carbonate is used as the basic reagent and the calcined material is washed with acid.

8. A process as claimed in claim 1 wherein sodium hydroxide is used as the basic reagent and the calcining is carried out in the presence of carbon dioxide and the calcined material is washed with acid.

9. A process as claimed in claim 7 wherein the amount of acid is between 3% and 5% by weight of zircon.

10. A process according to claim 8 wherein the amount of acid is between 3% and 5% by weight of zircon.

* * * * *